United States Patent
Thames et al.

(10) Patent No.: US 6,599,972 B2
(45) Date of Patent: *Jul. 29, 2003

(54) LATEX COMPOSITIONS CONTAINING ETHYLENICALLY UNSATURATED ESTERS OF FATTY COMPOUNDS AND APPLICATIONS THEREOF

(75) Inventors: Shelby Freland Thames, Hattiesburg, MS (US); Kamlesh Gopichand Panjnani, Hattiesburg, MS (US); Olan Stanley Fruchey, Corpus Christi, TX (US)

(73) Assignee: University of Southern Mississippi, Hattiesburg, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/759,305

(22) Filed: Jan. 12, 2001

(65) Prior Publication Data

US 2001/0021739 A1 Sep. 13, 2001

Related U.S. Application Data

(63) Continuation of application No. 08/773,668, filed on Dec. 24, 1996, now Pat. No. 6,174,948.

(51) Int. Cl.$^7$ .................................................. C08K 5/04
(52) U.S. Cl. .................. 524/398; 524/394; 524/399; 524/400; 524/544; 524/547; 524/548; 524/551; 524/555; 524/556; 524/558; 524/560; 524/561; 524/599; 524/606; 524/608; 524/773; 554/24; 554/25; 554/26; 554/27; 554/30; 554/213; 554/219

(58) Field of Search .................. 524/400, 398, 524/399, 394, 547, 544, 548, 551, 555, 556, 558, 560, 561, 599, 606, 608, 773; 554/24, 25, 26, 27, 30, 213, 219

(56) References Cited

U.S. PATENT DOCUMENTS 6,174,948 B1 * 1/2001 Thames et al. ............. 524/398

* cited by examiner

*Primary Examiner*—Judy M. Reddick
(74) *Attorney, Agent, or Firm*—Howrey Simon Arnold & White, LLP

(57) ABSTRACT

Novel latex or emulsion compositions containing internally plasticizing and crosslinkable monomers derived from traditional semi-drying or non-drying oils are disclosed and claimed. The monomers are ethylenically unsaturated derivatives of long-chain olefinic compounds. Preferred embodiments include latex formed from acrylate or methacrylate esters of fatty alcohols. A process for the synthesis of the latex composition is also disclosed, which involves (a) polymerization of the ethylenically unsaturated derivatives of a long-chain olefinic compound in an aqueous phase with at least one other copolymerizable monomer; and (b) blending of so formed polymer with at least one drier and a surfactant to form the novel latex or emulsion compositions. These compositions form films at low minimum film forming temperatures (MFT) ranging from −5 to 10° C. and cure to above ambient glass transition ($T_g$) polymers without the use of traditional organic cosolvents which contribute to environmental pollution via volatile organic compounds (VOCs) emissions. These compositions are therefore useful in waterborne coatings, contact and pressure sensitive adhesives, and inks.

21 Claims, No Drawings

LATEX COMPOSITIONS CONTAINING ETHYLENICALLY UNSATURATED ESTERS OF FATTY COMPOUNDS AND APPLICATIONS THEREOF

This is a continuation of co-pending application Ser. No. 08/773,668 filed Dec. 24, 1996, now U.S. Pat. No. 6,179,948 the contents of which are hereby incorporated herein by reference.

BACKGROUND OF THE INVENTION

1. Field of the Invention

This invention relates to odorless and organic solvent-free novel waterborne latex or emulsion compositions which contain an internally plasticizing and crosslinkable monomer(s) derived (or obtained) from fatty compounds having at least one double bond in their backbone. More particularly, though not exclusively, this invention relates both to novel latex or emulsion compositions containing either a vinyl ether, vinyl ester, or an acrylic ester of a long-chain olefinic monomer derived from semi- and/or non-drying oils and a process for making the same. The invention is also directed to the utility of these novel compositions in coatings, adhesives, and inks which have essentially no volatile organic components (VOCs) and feature enhanced application and performance properties.

2. Description of the Prior Art

Recent Congressional enactments have forced coatings manufacturers to develop new coating formulations that contain low VOCs yet feature good performance properties. However, attempts at developing new formulations that contain environmentally acceptable low VOCs have only resulted in formulations with poor performance characteristics which are also economically unattractive.

One problem encountered by the coatings manufacturers is the development of formulations containing low VOC-coalescing aids or plasticizers. For instance, emulsion polymers are currently formulated with coalescing aids or plasticizers in order to form films at and below ambient conditions yet dry to films of sufficient glass transition temperature ($T_g$) to perform adequately at and above room temperature. In general, the ability of emulsion polymers to form or coalesce into film is governed by the minimum film forming temperature (MFT) of the polymer in question, which typically approximates $T_g$ of that polymer. Thus, there is a dilemma, i.e., low MFT polymers are required in order to exhibit coalescence, flow, and surface wetting properties. However, if the polymer remains soft and tacky, the coatings are not usable. Therefore, it is necessary to develop a technology in which coating formulations contain suitable ingredients with an initial low MFT, followed upon application forms nontacky, durable, hard, and water resistant surfaces having a $T_g$ significantly above their MFT.

There are few references in literature which describe low MFT coating compositions which cure to form high $T_g$ films. One such example utilizes a terpolymer binder known as Vinamul 3692, which is used in solventless paints. The terpolymer is formed from ethylene, vinyl acetate, and acrylated ethylene vinyl acetate. Although the physical properties of the paint films are generally good, the latex synthesis involves the use of ethylene in high pressure reactors. Such a manufacturing protocol is not available to most latex manufacturers and is not cost effective.

There have been many other reports that disclose coatings compositions that cure or dry at ambient conditions into durable products. For example, vinylic derivatives of auto-oxidizable drying oils have been synthesized, which are formulated into crosslinkable emulsion compositions. However, these emulsion compositions still required the use of VOCs for film formation and formulation into usable coatings. Moreover, the polymers possessed other drawbacks, i.e., the free radical polymerizations of vinyl monomers of high iodine number oils are kinetically unfavorable and the products exhibit moderate to marked incompatibility.

Various other coating compositions which cure under ambient conditions are known in the prior art. A few such examples involve curing by a chemical reaction such as epoxide-carboxylic acid reaction, isocyanate-moisture reaction, polyaziridine-carboxylic acid reaction, and activated methylene-unsaturated acrylic reaction.

There are also literature references which disclose derivatives of fatty compounds suitable in the formation of coatings. For example, acryloxymethyl substituted fatty compounds have been claimed to be useful in radiation curable coating formulations and as binders in inks. Acrylate esters of castor oil have also been reported to be potentially useful as binders in coatings and other applications.

However, none of these references discloses use of an internally plasticizing and crosslinkable monomer derived from either a traditional semi-drying or a non-drying oil for the formation of coating formulations. In addition, none of the references discussed above utilizes inexpensive and readily available acrylate or other ethylenically unsaturated esters of long-chain olefinic monomers derived from semi- or non-drying oils to form latex or emulsion compositions. Furthermore, none of the references mentioned above describes latex or emulsion compositions featuring low MFTs that cure to above ambient $T_g$ without the use of any VOCs and yet featuring enhanced properties.

Therefore, it is an object of this invention to provide novel compositions having low VOCs and low odor which are suitable for forming coatings, adhesives, and inks formulations comprising an internally plasticizing and crosslinkable monomer. An additional objective of this invention is to provide a process for the synthesis of the novel latex or emulsion compositions. Yet another objective of this invention is to provide a variety of utilities for these novel compositions. Such utilities include as a binder in coatings, adhesives, and inks formulations featuring enhanced properties yet contributing zero VOCs. The compositions of the present invention have no precedence in the prior art.

Prior Art

The following references are disclosed as background art and for informational purpose.

U.S. Pat. No. 4,626,582 discloses acyloxymethyl fatty compounds which are useful as monomers in the preparation of radiation curable coatings.

U.S. Pat. No. 4,826,907 discloses an acrylic or methacrylic resin emulsion coating composition, and its use.

U.S. Pat. No. 4,906,684 discloses ambient curing coating compositions which are made from aqueous dispersions of copolymers of acetoacetoxyethyl acrylate or methacrylate, glycidyl acrylate or methacrylate, and ethylenically unsaturated polymerizable acid and a different monomer copolymerizable therewith.

Eur. Pat. Appln. No. 466,409 discloses a polymer blend useful as a binder in an aqueous coating composition containing no coalescent.

Indian Pat. No. 153,599 describes a process for preparing novel vinyl monomers from ricinoleic acid and mixed fatty acids of castor oil.

Indian Pat. No. 154,467 describes a process for the preparation of novel acrylic monomers and polymers from castor oil and methyl ricinoleate.

*J. American Oil Chem. Soc.,* (1966) (pp 542–545) describes synthesis of acrylate esters of various hydroxy acid derivatives obtainable from castor oil.

All of the references described herein are incorporated herein by reference in their entirety.

SUMMARY OF THE INVENTION

Surprisingly, it has now been found that coatings, adhesives and inks having essentially no VOCs can readily be formed from novel latex or emulsion compositions. In addition, the novel compositions of the present invention are comprised of a monomer which features a plasticizing property, and thus serves as an internal plasticizer and subsequently as a crosslinking agent. The monomers suitable for forming the latex or emulsion compositions of this invention are derivatives of semi- or non-drying oils having an ethylenically unsaturated derivative of a long-chain olefinic compound. Preferred monomers of this invention are acrylate or methacrylate esters of long-chain olefinic compounds. The latices formed by this invention have utility in numerous applications such as in coatings, adhesives, and inks formulations.

Accordingly, the present invention provides a composition having low volatile organics content and low odor that is suitable for forming coatings, adhesives, and inks formulations comprising an aqueous dispersion composed of a blended mixture of:

(a) a polymer obtained by the polymerization of:
  (i) an internally plasticizing and crosslinkable monomer derived from a fatty acid compound having at least one double bond; and
  (ii) one or more of ethylenically unsaturated monomers copolymerizable therewith;
(b) a drier selected from the group consisting of aliphatic carboxylic acid salts of cobalt, manganese, lead, zirconium, calcium, and mixtures thereof; and
(c) a surface-active agent;

wherein the total weight percent of the polymer in said aqueous dispersion is at least from about 5 and not more than about 80 weight percent, wherein the monomers (i) and (ii) are present in the weight ratio ranging from about 1:2 to about 1:99.

In another aspect of the present invention, a process for the formation of a waterborne formulation for coatings, inks or adhesives containing a polymer formed from an ethylenically unsaturated derivative of a long-chain olefinic compound derived (or obtained) from a semi- or non-drying oil is also provided.

DETAILED DESCRIPTION OF THE INVENTION

Surprisingly, it has now been found that coatings, adhesives and inks having essentially no VOCs can readily be formed from novel latex or emulsion compositions. In addition, the novel compositions of the present invention are comprised of a monomer which features a plasticizing property, and thus serves as an internal plasticizer. The monomers suitable for forming the latex or emulsion compositions of this invention are derivatives of semi- or non-drying oils having an ethylenically unsaturated derivative of a long-chain olefinic compound. Preferred monomers of this invention are acrylate or methacrylate esters of long-chain olefinic monomers. The latices formed by this invention have utility in numerous applications such as in coatings, adhesives, and inks formulations.

Accordingly, the present invention provides a composition having low volatile organics content and low odor that is suitable for forming coatings, adhesives, and inks formulations comprising an aqueous dispersion composed of a blended mixture of:

(a) a polymer obtained by the polymerization of:
  (i) an internally plasticizing and crosslinkable monomer derived from a fatty acid compound having at least one double bond; and
  (ii) one or more of ethylenically unsaturated monomers copolymerizable therewith;
(b) a drier selected from the group consisting of aliphatic carboxylic acid salts of cobalt, manganese, lead, zirconium, calcium, and mixtures thereof; and
(c) a surface-active agent;

wherein the total weight percent of the polymer in said aqueous dispersion is at least from about 5 and not more than about 80 weight percent, wherein the monomers (i) and (ii) are present in the weight ratio ranging from about 1:2 to about 1:99.

As used herein, the term internally plasticizing monomer is intended to be generic to a class of compounds wherein the monomers of this invention are capable of polymerizing and at the same time act as a plasticizer (i.e., "in-chain" or "internal plasticization") for the polymer formed therefrom. Generally, the coatings formulations contain a volatile organic solvent additive(s) that acts as a plasticizer for the polymeric binder. The role of these volatile organic plasticizers is to reduce the apparent $T_g$ of the polymer thereby permitting the coating to form a useful film at a temperature below the real $T_g$ of the polymer. Thus, by incorporating the internally plasticizing monomers of the present invention, the polymers or copolymers formed in this invention are self plasticized with no subsequent VOC emissions. As a result, the compositions of the present invention which are suitable for forming coatings, adhesives, and inks exhibit lower minimum film forming temperatures (MFTs) than the corresponding $T_g$'s of the cured compositions.

Additionally, the internally plasticizing monomers of the present invention are also capable of crosslinking during the drying process. The term crosslinking used herein is intended to mean that the monomers of the present invention are capable of bonding to itself, and/or another compound or polymeric chain triggered by a suitable chemical or physical reaction. In a typical coating formulation, for example, the formulation is first applied onto a desired surface and then cured by suitable means during which time the crosslinking of the polymeric binder occurs. Thus, the monomers of the present invention may be crosslinked after forming films from the coating compositions. Curing can be affected by a wide variety of well known techniques in the art.

The internally plasticizing and crosslinkable monomers of the present invention are preferably derived from semi- or non-drying oils. The term derived used herein is intended to mean that the monomers of the present invention are obtained or formed from a wide variety of semi- or non-drying oils. Various chemical and physical modifications of these semi- or non-drying oils may be made to obtain the desirable monomers of the present invention using the methods well known in the art.

Various semi- and non-drying oils may be employed for the formation of the monomers of the present invention. The terms semi- and non-drying oils used herein are defined as those oils which do not show marked increase in viscosity on exposure to air. Generally, oils are classified as drying, semi-drying, or non-drying based on their "iodine value," that is, the number of grams of iodine required to saturate the double bonds of 100 grams of an oil. In accordance with this definition, oils having an iodine value of about 120 to 150 are generally considered to be semi-drying oils, and oils having less than 120 are generally considered to be non-drying oils. Illustrative examples of such semi-drying oils include safflower oil, sunflower oil, soybean oil, and tobaccoseed oil. Illustrative examples of such non-drying oils include cottonseed oil, coconut oil, rapeseed oil, castor oil, and lesquerella oil. A detailed description of the classification of various oils may be found in "*Surface Coatings—Raw Materials and Their Usage,*" Vol. I, Chapman and Hall, Chapter 4, p-45, (1993), incorporated herein by reference in its entirety.

Accordingly, the preferred internally plasticizing and crosslinkable monomers derived from semi- or non-drying oils of the present invention are substituted ethylenically unsaturated derivatives of long-chain olefinic compounds of the formula I:

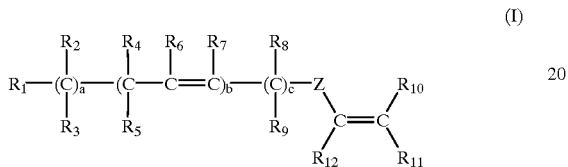

(I)

wherein
(a) $R_1$, $R_2$, $R_3$, $R_4$, $R_5$, $R_6$, $R_7$, $R_8$, and $R_9$, are the same or different and are each independently selected from the group consisting of:
hydrogen;
alkoxy group having 1 to 10 carbon atoms;
alkoxyalkyl group having 1 to 10 carbon atoms; and
linear or branched alkyl and fluoroalkyl groups having the formula $C_nH_xF_y$, where n is an integer from 1 to 10, x and y are integers from 0 to 2n+1, and the sum of x and y is 2n+1;
(b) Z is selected from the group consisting of:
—(CO)—O—;
—(CO)—O—R—O—(CO)—;
—(CO)—O—R—(CO)—O—;
—(CO)—O—R—O—;
—CH$_2$O—;
—CH$_2$O—(CO)—;
—CH$_2$O—R—O—;
—CH$_2$O—R—O—(CO)—;
—CH$_2$O—R—(CO)—O—;
—(CO)—NR'—R—O—(CO)—;
—(CO)—NR'—R—(CO)—O—;
—(CO)—NR'—R—O—;
—CH$_2$NR'—R—O—(CO)—;
—CH$_2$NR'—R—(CO)—O—;
—CH$_2$NR'—R—O—; and
—CH$_2$NR'—(CO)—;
where (i) R is a divalent organic moiety selected from the group consisting of:
arylene and substituted arylene group having 6 to 10 carbon atoms; and
linear or branched alkylene and fluoroalkylene groups having the formula $C_nH_xF_y$, where n is an integer from 1 to 10, x and y are integers from 0 to 2n, and the sum of x and y is 2n; and
(ii) R' is selected from the group consisting of:
hydrogen;
phenyl and substituted phenyl;
tolyl and substituted tolyl;
benzyl and substituted benzyl;
alkoxyalkyl group having 1 to 10 carbon atoms;
hydroxyalkyl group having 1 to 10 carbon atoms;
acyloxyalkyl group having 1 to 10 carbon atoms;
a linear or branched alkenyl group having 2 to 10 carbon atoms; and
linear or branched alkyl and fluoroalkyl groups having the formula $C_nH_xF_y$, where n is an integer from 1 to 10, x and y are integers from 0 to 2n+1, and the sum of x and y is 2n+1;
(c) $R_{10}$, $R_{11}$, and $R_{12}$ are the same or different and are independently selected from the group consisting of:
hydrogen;
a carboxylate of the formula —COOR, where R is alkyl group having 1 to 10 carbon atoms, or phenyl and substituted phenyl;
phenyl and substituted phenyl;
tolyl and substituted tolyl;
benzyl and substituted benzyl;
a linear or branched alkenyl group having 2 to 10 carbon atoms; and
linear or branched alkyl and fluoroalkyl groups having the formula $C_nH_xF_y$, where n is an integer from 1 to 10, x and y are integers from 0 to 2n+1, and the sum of x and y is 2n+1; and
(d) a, b, and c, are integers, where a and c have a value of from 0 to 20, and sum of a and c is at least 10, and b has a value of 1 or 2.

In the above definitions and throughout the present specification, alkoxy means straight or branched chain alkoxy having 1 to 10 carbon atoms, and includes, for example, methoxy, ethoxy, n-propoxy, isopropoxy, n-butoxy, isobutoxy, tert-butoxy, pentyloxy, hexyloxy, heptyloxy, octyloxy, nonanyloxy, decanyloxy, 4-methylhexyloxy, 2-propylheptyloxy, and 2-ethyloctyloxy.

Alkoxyalkyl means that the alkoxy moiety and the alkyl moiety each are straight or branched chains having 1 to 10 carbon atoms, and includes, for example, methoxymethyl, ethoxymethyl, propoxymethyl, isopropoxymethyl, butoxymethyl, isobutoxymethyl, tert-butoxymethyl, pentyloxymethyl, hexyloxymethyl, heptyloxymethyl, octyloxymethyl, decyloxymethyl, 2-methoxyethyl, 2-ethyloxyethyl, 2-propoxyethyl, 2-butoxyethyl, 2-hexyloxyethyl, 2-octyloxyethyl, 2-nonyloxyethyl, 3-methoxypropyl, 3-ethoxypropyl, 3-propoxypropyl, 3-butoxypropyl, 3-hexyloxypropyl, 3-octyloxypropyl, 3-decyloxypropyl, 4-methoxybutyl, 4-ethoxybutyl, 4-propoxybutyl, 4-butoxybutyl, 4-hexyloxybutyl, 4-octyloxybutyl, 4-nonyloxybutyl, 5-methoxypentyl, 5-ethoxypentyl, 5-propoxypentyl, 5-butoxypentyl, 5-pentyloxypentyl, 5-hexyloxypentyl, 5-octyloxypentyl, 5-decyloxypentyl, 6-methoxyhexyl, 6-ethoxyhexyl, 6-propoxyhexyl, 6-butoxyhexyl, 6-pentyloxyhexyl, 6-hexyloxyhexyl, 6-octyloxyhexyl, 6-decyloxyhexyl, 8-methoxyoctyl, 8-ethoxyoctyl, 8-butoxyoctyl, 8-hexyloxyoctyl, 8-octyloxyoctyl, 10-methoxydecyl, 10-propoxydecyl, 10-pentyloxydecyl, and 10-decyloxydecyl.

Hydroxyalkyl means a hydroxy containing straight or branched chain alkyl group having 1 to 10 carbon atoms, and includes, for example, hydroxymethyl, 2-hydroxyethyl, 1-hydroxyethyl, 3-hydroxypropyl, 2-hydroxypropyl, 4-hydroxybutyl, 3-hydroxy-3-methylpropyl, 5-hydroxypentyl, 4-hydroxy-3-methylbutyl, 6-hydroxyhexyl, 8-hydroxyoctyl, and 10-hydroxydecyl.

Acyloxyalkyl means that acyloxy moiety and the alkyl moiety each are straight or branched chains having 1 to 10 carbon atoms, and includes, for example, acetoxymethyl, acryloxymethyl, methacryloxymethyl, propionoxymethyl, acetoxyethyl, acryloxyethyl, butyroxyethyl, acetoxybutyl, acryloxybutyl, hexanoyloxybutyl, acetoxyhexyl, acryloxyhexyl, octanoyloxyhexyl, acetoxyoctyl, acryloxyoctyl, acetoxydecyl, and acryloxydecyl.

Substituted phenyl, tolyl, and benzyl means phenyl, tolyl, or benzyl ring substituted by at least one suitable substituent group selected from the group consisting of amino, nitro, hydroxy, straight or branched alkoxy group such as methoxy, straight or branched alkyl and/or fluoroalkyl group such as methyl, trifluoromethyl, alkenyl group such as vinyl, and halogen (fluorine, chlorine, bromine or iodine).

Representative examples of linear or branched alkyl and fluoroalkyl groups having 1 to 10 carbon atoms include, for example, methyl, trifluoromethyl, ethyl, 1-1-2-trifluoroethyl, pentafluoroethyl, propyl, perfluoropropyl, isopropyl, butyl, isobutyl, tert-butyl, perfluorobutyl, 1-1-2-3-3-pentafluorobutyl, pentyl, hexyl, heptyl, octyl, nonyl, and decanyl.

Linear or branched alkenyl means alkenyl moiety having 2 to 10 carbon atoms, and includes, for example, vinyl, 1-propenyl, allyl, isopropenyl, 2-butenyl, 1-3-butadienyl, 2-pentenyl, 2-hexenyl, 2-octenyl, 3-nonenyl, and 4-decenyl.

Examples of arylene and substituted arylene group having 6 to 10 carbon atoms are: 1,4-phenylene, 1,3-phenylene, 1,2-phenylene, 2,6-naphthylene, 2,7-naphthylene, 1,4-naphthylene, 4-4'-biphenylene, and 3-4'-biphenylene.

Examples of linear or branched alkylene and fluoroalkylene groups having 1 to 10 carbon atoms include methylene, difluoromethylene, 1-2-ethylene, 1-2-tetrafluoroethylene, 1-2-trifluoroethylene, 1-3-propylene, 1-2-propylene, 1-3-hexafluoropropylene, 1-3-tetrafluoropropylene, 1 4-butylene, 1-5-pentylene, 1-6-hexylene, 1-7-heptylene, 1-8-octylene, 1-9-nonylene, 4-ethyl-1-8-octylene 1-10-decylene.

Furthermore, and as used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. Illustrative substituents include, for example, those described hereinabove. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

As mentioned earlier, the preferred internally plasticizing monomers of this invention are derived (or obtained) from semi- or non-drying oils; that is, semi- or non-drying oils are subjected to suitable chemical or physical transformations to obtain these monomers. These starting materials may be obtained from natural sources such as vegetable or animal sources or may be synthetic. Broadly, the monomers of this invention belong to three distinctive types, namely, substituted and unsubstituted vinyl esters, vinyl ethers, and acrylic esters and amides. Thus, the starting materials which may be converted to the desired internally plasticizing monomers of this invention contain suitable functional groups such that they can be transformed into one of these desirable monomers.

For example, the fatty compounds containing —CH$_2$OH (i.e., fatty alcohol) or —CH$_2$NH$_2$ (i.e., fatty amine) terminal groups may be employed for the formation of monomers containing the acrylic derivatives. The acrylic derivatives in this instance is formed by the reaction of the fatty compounds with acrylic derivatives such as acryloyl chloride, acrylic acid, or alkyl acrylates in the presence of suitable acid, base, or a metal catalyst.

As stated earlier, the preferred fatty acids or its derivatives that may be employed for forming the monomers of this invention are obtained from semi- or non-drying oils. Representative examples of such acids include oleic acid, elaidic acid, linoleic acid, erucic acid, brassidic acid, nervonic acid and vernolic acid. These acids may be suitably transformed to desirable starting materials using any of the well-known methods known in the art.

However, the fatty acids obtained from the drying oils as such are not suitable for forming the starting materials of this invention (i.e., I). In general, fatty acids containing more than two double bonds in their back bone are not suitable starting materials for this invention without further derivation. Such fatty acids, for example, include linolenic, eleostearic, licanic, and isanic acid. Accordingly, the non-drying oils are generally more preferred in this invention and include, for example, cottonseed, coconut, rapeseed, lesquerella, castor, and vernonia oil. The oils having functional groups such as hydroxy group in castor oil may be suitably protected before employing as starting materials in this invention. Similarly, the drying oils can also be suitably transformed into suitable fatty compounds having an iodine value of 150 or less such that they can be used as semi- and/or non-drying oil components of this invention.

A wide variety of ethylenically unsaturated moieties or its derivatives may be used for the formation of desired starting materials of the present invention. The compounds having at least one polymerizable ethylenic bond per molecule (i.e., a double bond) are preferred. Representative examples of such ethylenically unsaturated compounds include, without limitation, acrylic, methacrylic, maleic, fumaric, itaconic, ethacrylic, crotonic, citraconic, cinnamic, methyl hydrogen fumarate, benzyl hydrogen maleate, butyl hydrogen maleate, octyl hydrogen itaconate, dodecyl hydrogen citraconate, and vinyl acetate.

The polymers formed from the long-chain olefinic monomers of the present invention further consists of at least one copolymerizable monomer. Such a copolymerizable monomer include, broadly, polymerizable acid monomer, a monomer containing at least one ethylenically unsaturated polymerizable group, and various other ethylenically unsaturated monomers well known in the art.

Polymerizable acid monomers used in this invention are the well known mono- or polycarboxylic acids which contain one polymerizable bond per molecule. Examples of such acids are acrylic acid, methacrylic acid, maleic acid, fumaric acid, itaconic acid, ethacrylic acid, crotonic acid, citraconic acid, and half esters of the dicarboxylic acids wherein the esterified alcohol group contains from 1 to about 20 carbon atoms. Examples of suitable half esters are methyl hydrogen maleate, methyl hydrogen fumarate, benzyl hydrogen maleate, butyl hydrogen maleate, octyl hydrogen itaconate, dodecyl hydrogen citraconate, and the like. Carboxylic acid anhydrides such as maleic anhydride can also be used. The preferred acids for use in this invention are acrylic and methacrylic acids.

Copolymerizable monomers that contain at least one ethylenically unsaturated polymerizable group referred to hereinabove are any of the well known monomers which contain at least one ethylenically unsaturated polymerizable group per molecule and are copolymerizable with the other monomers. Examples of such monomers are acrylic and methacrylic esters wherein the ester group contains 1 to about 20 carbon atoms, e.g., methyl acrylate, methyl methacrylate, ethyl acrylate, ethyl methacrylate, isopropyl acrylate, isopropyl methacrylate, butyl acrylate, butyl methacrylate, 2-ethylhexyl methacrylate, decyl acrylate, lauryl methacrylate, benzyl acrylate, and the like. Esters of various other unsaturated acids include butyl fumarate, octyl fumarate, butyl maleate, and octyl maleate.

Other acrylic or methacrylic esters which can be used in this invention are multifunctional acrylates or methacrylates, and includes, for example, propylene glycol monoester of acrylic acid, propylene glycol monoester of methacrylic acid, ethylene glycol monoester of acrylic acid, ethylene glycol monoester of methacrylic acid, glycidyl acrylate, glycidyl methacrylate, hydroxyethyl acrylate, hydroxyethyl methacrylate, and hexanediol diacrylate.

Other copolymerizable monomers are vinyl aromatic monomers, such as styrene, para-acetoxystyrene, vinyl toluene, alpha methyl styrene, vinyl pyridine and the like as well as nitriles and amides, e.g., acrylonitrile and acrylamide. Other olefinic monomers such as ethylene, propylene, and butadiene are also suitable comonomers for this invention.

Additional copolymerizable monomers that can be used in this invention are the derivatives of the hypothetical vinyl alcohol, i.e., aliphatic vinyl esters such as vinyl formate, vinyl acetate, vinyl propionate, vinyl butyrate, vinyl heptanoate, vinyl pelargonate, vinyl 3,6-dioxaheptanoate, vinyl 3,6,9-trioxaundecanoate, the vinyl ester of versatic acid (sold under the tradename Veova 10™), vinyl esters of neo acids and the like. Other vinyl monomers such as vinyl chloride, vinyl sulfonate, vinyl silanes, and vinylidene chloride are also suitable comonomers.

Various other copolymerizable monomers that impart enhanced properties to the resulting compositions of the present invention may also be used. One such example is a wet adhesion promoter which improves adhesion of the compositions to a wide variety of substances including wood, plastic, and metal surfaces. Illustrative examples of such wet adhesion promoting monomers include dimethylaminoethyl methacrylate, methacrylamidoethylethyleneurea (sold under the tradename Sipomer® WAM II by Rhone-Poulenc), acrylamidoethylethyleneurea, 3-isopropenyl-α,α-dimethylbenzyl isocyanate, and styrene sulfonate.

Any monomers which are copolymerizable with the ethylenically unsaturated long-chain olefinic monomer I of this invention can be used in this invention. Such monomers are those which contain no groups which are reactive under polymerization conditions with carboxylic acid groups, or various other reactive groups including the group Z that may be present in I. Thus, suitable comonomers may be employed depending upon the groups present in the long-chain olefinic monomer I.

The types and amounts of copolymerizable monomers used in this invention will vary depending on the particular end use for which the product of this invention is intended. Such variations are well known and can be readily determined by those skilled in the art. In general, the weight percents of the polymer produced from the internally plasticizing compound, i.e., the long-chain olefinic monomer I and the copolymerizable monomer in the resulting composition ranges from about 5 and not more than about 80 weight percent based upon the total weight of the composition. Preferably, the total weight percents range from about 30 to about 70 weight percent based on the total weight of the composition. The weight ratio of the long-chain olefinic monomer I to the copolymerizable monomer (s) generally range from about 1:2 to about 1:99, preferably the weight ratio range from about 1:7 to about 1:20.

In addition to the polymeric resins formed from the monomer I and the comonomers mentioned hereinabove, the coatings or adhesives or inks compositions of the present invention contain at least one drier. The driers are materials that promote or accelerate the curing or hardening of film formers. Typically, driers are used in conjunction with coatings formulations containing the drying oil components. Surprisingly, it has now been found that the metal driers are particularly effective in curing the compositions of the present invention which contain semi- or non-drying oil components.

The suitable drier is any material which will function as a promoter or an accelerator for the curing or hardening of the film and includes, without limitation, neutral soaps of the formula $(R_x—COO^-)_2M^{2+}$ or $(R_x—COO^-)_3M^{3+}$; acid soaps of the formula $(R_x—COO^-)_2M^{2+}.R_x—COOH$ or $(R_x—COO^-)_3M^{3+}.R_x—COOH$; basic soaps of the formula $(R_x—COO^-)_2M^{2+}.OH$; organic complexed or mixed soaps of the formula $(R_x—COO^-)(R'_x—COO^-)M^{2+}$ or $(R_x—COO^-)(R'_x—COO^-)(R''_x—COO^-)M^{3+}$; inorganic/organic complexed or mixed soaps of the formula $O—M^{2+}—O—CO—R_x$, $X—O—M^{2+}—O—CO—R_x$, and $O—M^{2+}—O—CO—R_x$; where $R_x—COO^-$, $R'_x—COO^-$, and $R''_x—COO^-$ are aliphatic carboxylic acid ions having 6 to 20 carbon atoms, M=metal ion, and X=phosphorus or boron.

The commonly used carboxylic acids for forming the metal driers are aliphatic acids, preferably fatty acids. Illustrative examples of fatty acids include rosin oil fatty acid, linseed oil fatty acid, and tall oil fatty acid. Various naphthenic acids obtained from certain petroleum crudes may also be used for forming the suitable metal driers. The naphthenic acids generally contain an average of 12–14 carbon atoms having a cyclopentane nucleus with the carboxyl group terminating a side chain and with one to three methylenic groups between the carboxyl and the nucleus. Various other synthetic acids having 8 to 10 carbon atoms are also used to form the metal driers, and include, for example, 2-ethylhexanoic acid and neodecanoic acids.

The most commonly used drier metals are cobalt, zirconium, manganese, calcium and lead. Other metals such as zinc, copper, barium, vanadium, cerium, iron, potassium, strontium, aluminum, bismuth, and lithium have also been used as drier metals. Particularly preferred metal driers are aliphatic carboxylic salts of cobalt, manganese, lead, zirconium, calcium, and mixtures thereof It has been found that cobalt salts sold under the tradename Co Hydro-Cure® II are particularly preferred metal driers for the compositions of the present invention. A detailed description of various metal driers may be found in "Surface Coatings—Raw Materials and Their Usage," Vol. I, Chapman & Hall, Chapter 33, pp 592–606 (1993), incorporated herein by reference in its entirety.

Although metal driers mentioned hereinabove are particularly effective in the drying of the films, various other non-metallic driers well-known in the art may also be employed either as primary driers, auxiliary driers, or as drier accelerators. Many auxiliary non-metallic driers are effective in improving the solubility of the active drier metal in the reactive medium or alter the drier metals' redox potential. Examples of such non-metallic driers include 8-hydroxyquinoline, quinoline, salicyl aldoxime, pyridine-2-carbaldoxime, acetylacetonate enamines, 2-2'-bipyridyl, ethylenediamine, propylenediamine, pyridine, o-vinylpyridine, o-aminopyridine, aniline, o-phenylenediamine, o-toluidine, α-naphthylamine, o-phenanthroline, dipropylamine, diamylamine, acrylonitrile, succinonitrile, o-tolunitrile, o-toluamide, o-tolyl isocyanate, phenyl isocyanate, naphthyl isocyanate, pyrrole, benzimidazole, benzotriazole, and the like. Particularly preferred non-metallic drier is 2-2'-bipyridyl sold under the tradename DRI-RX™.

As described hereinbelow, the compositions of this invention are prepared by polymerization of monomers emulsified in water using conventional emulsion polymerization procedures. A suitable surface-active agent generally known as surfactants are used for emulsification of the monomers. Suitable surfactants include cationic, anionic, amphoteric, or nonionic surfactants or mixtures thereof.

Examples of useful anionic surfactants are organosulfates and sulfonates, e.g., sodium and potassium alkyl, aryl, and aralkyl sulfates and sulfonates, such as sodium 2-ethylhexyl sulfate, potassium 2-ethylhexyl sulfate, sodium nonyl sulfate, sodium lauryl sulfate, potassium methylbenzene sulfonate, sodium dodecylbenzene sulfonate, potassium toluene sulfonate and sodium xylene sulfonate; higher fatty alcohols, e.g., stearyl, lauryl, etc., which have been ethoxylated and sulfonated; dialkyl esters of alkali metal sulfosuccinic acid salts, such as sodium diamyl sulfosuccinate, sodium dioxtyl sulfosuccinate, and sodium dioctyl sulfosuccinate, formaldehyde-naphthalene sulfonic acid condensation products; and alkali metal salts, partial alkali metal salts and free acids of complex organic phosphate esters.

Examples of useful cationic surfactants include alkylamine salts such as laurylamine acetate, quaternary ammonium salts such as lauryl trimethyl ammonium chloride and alkyl benzyl dimethylammonium chlorides, and polyoxyethylenealkylamines. Examples of the amphoteric surfactants are alkylbetaines such as lauryl-betaine.

Examples of nonionic surfactants which can be used in this invention are polyethers, e.g., ethylene oxide and propylene oxide condensates which include straight and branched chain alkyl and alkaryl polyethylene glycol and polypropylene glycol ethers and thioethers; alkylphenoxypoly(ethyleneoxy) ethanols having alkyl groups containing from about 7 to about 18 carbon atoms and having from about 4 to about 240 ethyleneoxy units, such as heptylphenoxypoly(ethyleneoxy) ethanols, nonylphenoxypoly(ethyleneoxy) ethanols; the polyoxyalkylene derivatives of hexitol including sorbitans, sorbides, mannitans and mannides; partial long-chain fatty acids esters, such as the polyoxyalkylene derivatives of sorbitan monolaurate, sorbitan monopalmitate, sorbitan monostearate, sorbitan tristearate, sorbitan monooleate and sorbitan trioleate; the condensates of ethylene oxide with a hydrophobic base, said base being formed by condensing propylene oxide with propylene glycol; sulfur containing condensates, e.g., those prepared by condensing ethylene oxide with higher alkyl mercaptans, such as nonyl, dodecyl, or tetradecyl mercaptan, or with alkylthiophenols wherein the alkyl group contains from about 6 to about 15 carbon atoms; ethylene oxide derivatives of long-chain carboxylic acids, such as lauric, myristic, palmitic, or oleic acids or mixtures of acids, such as tall oil fatty acids; ethylene oxide derivatives of long-chain alcohols such as octyl, decyl, lauryl, or cetyl alcohols; and ethylene oxide/propylene oxide copolymers sold under the tradename Pluoronics™.

A particularly useful surfactant which can be used in this invention is a nonionic surfactant which is an organosilanol derivative of tung oil, or linseed oil, or high erucic acid rapeseed oil. These surfactant compositions particularly feature high surface activity in forming stable emulsions of organic/water of various difficultly emulsifiable materials as compared with conventional emulsifying agents. These silanol-based surfactant compositions are described in copending, commonly assigned patent application Ser. No. 08/739,850, filed Oct. 30, 1996. Another class of preferred surfactants are those which are copolymerizable with the monomers described hereinabove.

The amounts of surfactants employed in the emulsion polymerization process will range from about 0.01 to about 10 weight percent, preferably about 0.2 to about 5 weight percent based on the total weight of monomers and water.

The compositions of the present invention may contain in addition to the polymeric resins and metal driers referred to hereinabove, as required, suitable additives such as protective colloids, fillers, coloring agents, antiseptics, biocides, dispersing agents, thickening agents, thixotropic agents, antifreezing agents, and pH adjusting agents.

Examples of protective colloids are partially and fully hydrolyzed polyvinyl alcohol, hydroxyethyl cellulose, hydroxymethyl cellulose, ethylhydroxyethyl cellulose, carboxymethyl cellulose, ethoxylated starch derivatives, polyacrylic acid, alkali metal polyacrylates, polyacrylamide, poly(methyl vinyl ether/maleic anhydride), polyvinylpyrrolidone, water soluble starch, glue, gelatin, water soluble alginates, guar, gum arabic and gum tragacanth. The amounts of protective colloids used in the composition varies depending upon the intended application and generally ranges from about 0.1 weight percent to about 2 weight percent based on the total weight of the composition.

Examples of fillers include talc, calcium carbonate, diatomaceous earth, mica, kaolin, barium sulfate, magnesium carbonate, Aerosil, vermiculite, graphite, alumina, silica and rubber powder. Such coloring agents as titanium dioxide and carbon black can also be used as the fillers. The amount of the filler may be properly selected, and when used, for example, ranges from about 10 weight percent to about 50 weight percent based on the total weight of the composition of the present invention.

Various organic pigments and inorganic pigments may be broadly used as the coloring agents, but non-toxic anticorrosive pigments are preferred. Examples of such pigments are phosphate-type anticorrosive pigments such as zinc phosphate, calcium phosphate, aluminum phosphate, titanium phosphate, silicon phosphate, and ortho- and fused phosphates of these; molybdate-type anticorrosive pigments such as zinc molybdate, calcium molybdate, calcium zinc molybdate, potassium zinc molybdate, potassium zinc phosphomolybdate and potassium calcium phosphomolybdate; and borate-type anticorrosive pigments such as calcium borate, zinc borate, barium borate, barium meta-borate and calcium meta-borate. The amount of the coloring agent used may also be properly selected based on the end-use application of the compositions of the present invention.

Examples of the antiseptics are pyrrole compounds, imidazole compounds, thiazole compounds, pyridine compounds and organic halogen compounds. The amount of the antiseptic can be suitably selected, and is, for example, up to about 4 percent by weight based on the total weight (as solids content) of the composition.

Examples of the biocides, which are used either as wet-state protectors (i.e., in-can protectors) or as film protectors of a coating composition, are a wide variety of bactericides, fungicides or algicides, and include, without limitation, zinc oxide, cuprous oxide, organotin pigments, copolymers of organotin esters of methacrylic acid with conventional acrylates, tributyl tin oxide, and mixtures thereof Other examples of biocides particularly useful as in-can protectors are oxazoladines, organosulfurs, and benzisothiazolins. Any general toxic agent may be suitable as a biocide.

The dispersing agents may, for example, be inorganic dispersing agents such as sodium salts of polycarboxylic acids, sodium or ammonium salt of fused naphthalene sulfonate, polyoxyalkylene alkyl ethers of phenol ether, sorbitan fatty acid esters, polyoxyalkylene fatty acid esters, glycerin fatty acid esters, polyoxyethylene styrene phenol, sodium tripolyphosphate and sodium hexametaphosphate. As mentioned above, novel organosilanol derivatives of tung oil, or linseed oil, or high erucic acid rapeseed oil which are useful as surfactants are also suitable as dispersing agents. The amount of the dispersing agent can again be properly selected depending on the end application of the composition, and may range up to about 10 weight percent based on the total weight of the composition.

The thickening and thixotropic agents may be one and the same or different and may be the same as the protective colloids referred to hereinabove. Examples of thickening or thixotropic agents are polyvinyl alcohol, cellulose derivatives such as hydroxyethyl cellulose, hydroxypropyl cellulose and carboxymethyl cellulose salt, polyether compounds, urethane-modified polyether compounds, polycarboxylic acid compounds, sodium salts of polycarboxylic compounds, polyvinylpyrrolidone, polyoxyethylene derivatives such as polyethylene glycol ether and polyethylene glycol distearate, sodium alginate and inorganic materials such as sodium silicate and bentonite. The amounts of the thickening or the thixotropic agents can be properly chosen depending upon the type of end-application of the composition of the present invention.

Examples of the pH adjusting agents are sodium hydroxide, potassium hydroxide, sodium hydrogen carbonate, ammonia, triethanolamine, and β-dimethylaminoethanol. The amount of the pH adjusting agent may be a suitable one which is sufficient to adjust the pH of the composition to a desired value.

Various other additives having functional applications in coatings which are well known to those skilled in the art may also be used with the compositions of the present invention. Specific examples of such functional additives are corrosion inhibitors, ultraviolet light stabilizers, antioxidants, and the like.

In one of the specific embodiments of this invention, the composition suitable for forming latex or emulsion coatings comprises a polymer formed from an internally plasticizing compound derived (or obtained) from a non-drying oil having a substituted ethylenically unsaturated derivative of an unsubstituted long-chain olefinic compound of the formula II.

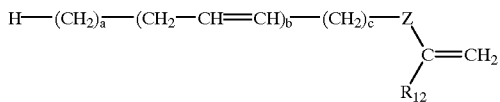

(II)

Where Z and $R_{12}$ are as defined above, however, preferably Z is either —(CO)—O—, or —$CH_2O$—(CO)—, or —$CH_2NH$—(CO)—, and $R_{12}$ is either hydrogen or methyl, i.e., ethylenically unsaturated moiety in this preferred embodiment is either vinyl, acrylic or methacrylic ester or amide. a, b, and c, in structure II are integers, where a and c have a value of from 5 to 12, and b has a value of 1 or 2.

The preferred copolymerizable monomers in this embodiment may be selected from the group consisting of vinyl acetate, vinyl chloride, vinyl ester of versatic acid, acrylonitrile, acrylamide, 2-ethylhexyl acrylate, 2-ethylhexyl methacrylate, 2-hydroxyethyl acrylate, 2-hydroxyethyl methacrylate, glycidyl acrylate, glycidyl methacrylate, acrylic acid, butyl acrylate, butyl methacrylate, methyl methacrylate, methyl acrylate, and styrene. Various metal driers described hereinabove may be employed in this embodiment, however, carboxylic acid salts of cobalt sold under the tradename Co Hydro-Cure II™ is particularly preferred. Similarly various combinations of anionic, cationic, amphoteric, or nonionic surfactants may be used in this embodiment.

The starting materials for the preferred long-chain olefinic ester II in the above embodiment is derived (or obtained) from either oleic, linoleic, or erucic acid. Thus, the long-chain olefinic compound II may be formed from appropriate starting material by subjecting it to suitable esterification reaction as described below.

Accordingly, the products formed from these starting materials which are the preferred long-chain olefinic compounds II are vinyl ester of oleic acid, oleyl acrylate, oleyl methacrylate, oleyl acrylamide, oleyl methacrylamide, and vinyl oleyl ether.

As stated earlier, by incorporation of the internally plasticizing monomers (i.e., I or II) into compositions of the present invention, the compositions exhibit lower MFTs and cure to resins having $T_g$s significantly higher than the MFTs. A further significance of this invention is the capability of tailoring the glass transition temperature ($T_g$) of the emulsion polymers and the MFTs of the compositions formed therefrom. The MFTs of a coating composition is determined experimentally by using an apparatus described by Protzman et al. in *J. Appl. Polymer Sci.*, 4, 81 (1960) incorporated herein by reference in its entirety. This apparatus is essentially an aluminum slab in which a constant and uniform temperature gradient may be maintained. The coating composition to be measured is spread uniformly in one of several sample wells. The point at which the film becomes discontinuous when dry is observed and this temperature is recorded as the MFT. To ensure that the films are actually continuous when formed above the MFT, the films are scrapped with a knife edge moving in the direction from low to high temperature. Below the MFT the material chips off the bar easily but above the MFT the coating does not lift off the bar. The transition between easily chipped to strong coating takes place at the MFT.

Conventional latex polymers generally feature MFTs closer to their $T_g$. Contrary to this conventional norm, the compositions of the present invention exhibit MFTs much below the final $T_g$ of the cured and crosslinked emulsion polymer contained therein, thus eliminating the need for a plasticizer which is generally a volatile organic compound (VOC). Particularly, the compositions of the above mentioned preferred embodiment forms film at low MFTs ranging from about −5 to about 10° C. and cures to a resin having a $T_g$ higher than 25° C.

The compositions of the present invention are particularly useful as coatings, adhesives, and inks formulations. A wide variety of coating formulations may be formed from the compositions of this invention. In general, the coating compositions are formed by incorporating the emulsion polymers formed from the internally plasticizing compound with one or more of the copolymerizable monomers described hereinabove. In addition, the coating compositions contain at least one drier and a surfactant, and as required, one or more of the additives described hereinabove.

The coatings produced by the cure of the internally plasticizing compound of this invention are useful in a wide variety of applications, i.e., architectural, decorative, maintenance, or industrial coatings. For example, in the electronics area these materials have applications as non-conductive coatings, e.g., solder masks for circuit boards or moisture resistant coatings for the boards or optical fibers.

Similarly, the compositions of the present invention may be formulated into a wide variety of adhesives and inks formulations having a diverse variety of applications. For example, in inks formulations the emulsion polymers of this invention are useful as binders. In general ink formulations differ from coating formulations in terms of the amounts of crosslinking monomers used, i.e., ink formulations generally contain higher amounts of the crosslinker. In addition, ink formulations may contain higher amounts of driers and drier accelerators for fast drying of these formulations. Accordingly, an ink formulation containing the emulsion polymers of this invention may be obtained by adding one or more pigments to the emulsion in accordance with a well-known method. The compositions of this invention may also be employed in forming radiation curable formulations, for example, UV curable high gloss coatings, inks, and adhesives formulations.

An adhesive formulation containing the emulsion polymers of this invention may similarly be obtained in accordance with a well-known method. Typically, an adhesive formulation may be formed using the emulsion polymer of this invention in combination with one or more of surfactants, protective colloids, and one or more of various other additives discussed hereinabove. The adhesive formulations of this invention are particularly suitable in the form of emulsion and/or aqueous solution, however, dry-mix, hot-melt, or solutions in organic solvent can also be formed using the polymers of this invention. A detailed description of adhesive formulations can be found in "Handbook of Adhesives," 2nd Ed., edited by I. Skiest, Chapter 28, pp 465–494 (1977), Van Nostrand Reinhold Co., incorporated herein by reference in its entirety.

In a further aspect the invention provides a process for the formation of a waterborne formulation for coatings, inks or adhesives containing a substituted long-chain olefinic compound having an ethylenically unsaturated moiety derived from a semi- or non-drying oil comprising the steps of:

(a) subjecting said derivative of a long-chain olefinic compound (monomer) to suitable polymerization conditions in the presence of at least one other ethylenically unsaturated copolymerizable monomer for a sufficient period of time and under suitable conditions of temperature and pressure to form the corresponding polymer dispersed in an aqueous phase; and (b) blending said dispersion of said polymer with at least one drier selected from the group consisting of aliphatic carboxylic acid salts of cobalt, manganese, lead, zirconium, calcium, and mixtures thereof, and in the presence of at least one ionic or non-ionic surface-active agent to form the formulation.

The starting material, i.e., the long-chain olefinic compound I (or II) is the same compound as described hereinabove and is derived (or obtained) from a semi- or non-drying oil.

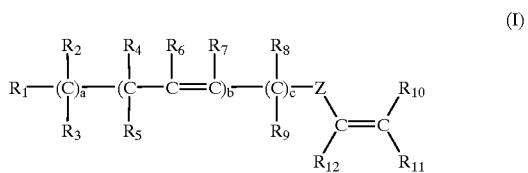

(I)

Where $R_1$, $R_2$, $R_3$, $R_4$, $R_5$, $R_6$, $R_7$, $R_8$, $R_9$, $R_{10}$, $R_{11}$, $R_{12}$, a, b, anc c are defined above. The preferred starting materials are those in which $R_1$ through $R_9$ are hydrogen, Z is —(CO)—O—, or —$CH_2$—O—(CO)—, or —$CH_2$—NH—(CO)—, and most preferably derived (or obtained) from the group consisting of oleic, linoleic, erucic and vernolic acids. These fatty acids are preferably obtained from semi- or non-drying oils. The preferred $R_{10}$ and $R_{11}$ are hydrogen and $R_{12}$ is either methyl or hydrogen.

The starting material I (or II) may be synthesized by reacting the corresponding fatty compound with appropriate ethylenically unsaturated compound. For example, if the starting material formed is an ester of a fatty alcohol, the fatty alcohol may be reacted with an ethylenically unsaturated carboxylic acid or its derivatives using any of the well-known esterification reactions to form such an ester. Specific examples of such esterification may be found in U.S. Pat. Nos. 4,745,213 and 5,243,069, incorporated herein by reference in their entirety. Similarly, vinyl esters of a fatty acid may be formed by reacting a fatty ester with vinyl acetate under transesterification reaction conditions in the presence of a suitable catalyst. A description of such a method may be found in Indian Patent No. 153,599 incorporated herein by reference in its entirety. The vinyl ethers of a fatty alcohol may similarly be synthesized by reacting suitable vinyl ether with a fatty alcohol in the presence of a suitable catalyst.

Accordingly, the preferred starting materials of this invention are substituted or unsubstituted vinyl esters of fatty acids, vinyl ethers of fatty alcohols, and acrylates and acrylamides of fatty alcohols or fatty amines. Representative examples of such starting materials, without limitation, are vinyl ester of oleic acid, oleyl acrylate, oleyl methacrylate, oleyl acrylamide, oleyl methacrylamide, vinyl oleyl ether, and the like.

In step (a) of the process of the present invention the olefinic monomer I is subjected to suitable emulsion polymerization conditions in the presence of one or more of suitable copolymerizable monomers having at least one polymerizable ethylenically unsaturated double bond. The suitable copolymerizable monomers of this invention are those which are described hereinabove. The polymerization of these monomers emulsified in water can be carried out using conventional emulsion polymerization procedures. Typically such polymerization reactions are carried out in the presence of one or more anionic, cationic, amphoteric, or nonionic surfactants. The suitable surfactants are those which are described hereinabove.

The monomers, i.e., the monomer I and the copolymerizable monomers of this invention are polymerized by means of a catalytic amount of a conventional free radical polymerization catalyst or catalyst system (which can also be referred to as an addition polymerization catalyst, a vinyl polymerization catalyst, or a polymerization initiator), preferably, one which is substantially water soluble. Among such catalysts are peroxides, such as hydrogen peroxide, tertiary butyl hydroperoxide, cumene hydroperoxide; alkali metal (e.g., sodium, potassium, or lithium), and ammonia persulfates, perphosphates, and perborates; azo nitriles, such as α,α-azobisisobutyronitrile, and water soluble azo initiators, such as WAKO™ initiators; and redox system including such combinations as mixtures of hydrogen peroxide, t-butyl hydroperoxide or the like, and any of the iron salts, titanous salts, zinc formaldehyde sulfoxylate, or sodium formaldehyde sulfoxylate; alkali metal or ammonium persulfate, perborate, or perchlorate together with an alkali metal bisulfite, such as sodium metabisulfite; and alkali metal persulfate together with an aryl phosphinic acid such as benzene phosphinic acid and the like. The free radical initiators may be activated either by a thermal or a redox source depending upon the nature of the initiators employed.

The temperature at which step (a) is conducted ranges from about 10° C. to about 90° C., preferably from about 20° C. to about 75° C. The pressure in this step (a) is not critical and can be subatmospheric, atmospheric, or super atmospheric.

The reaction times in step (a) will generally range from about 1 hour to about 6 hours or longer and sometimes under an inert atmosphere such as nitrogen.

Using the procedure of step (a) outlined herein, the ethylenically unsaturated derivative of a long-chain olefinic monomer I (or II) undergoes polymerization reaction with one or more of copolymerizable monomers to form the polymers dispersed in water.

In step (b) of the process of this invention the polymer so formed in step (a) still dispersed in water is further blended with at least one or more of a metal drier, surfactant, and desired combinations of the additives to form the waterborne formulations suitable for use in coatings, adhesives or inks applications. For instance, the suitable metal driers, surfactants, and various additives are those described hereinabove. The amounts of these components used depend on the intended use of the formulation and generally range in amounts as described hereinabove.

The blending in step (b) can be carried out in any of the mixing/blending devices generally known in the art. The temperature at which the blending is conducted is generally around ambient conditions, and ranges from about 10° C. to about 40° C. The reaction times for blending generally range from about 10 minutes to about 60 minutes and sometimes under an inert atmosphere such as nitrogen.

In one of the specific embodiments, a process for the formation of a latex containing acrylate or methacrylate ester of a fatty alcohol (compound) is also provided. In the step (a) of this process, a fatty alcohol III is subjected to esterification conditions in the presence of a substituted acrylic acid or its derivatives IV. In structure III, a, b, and c are as defined above. As mentioned hereinabove, the esterification reaction may be carried out using any of the well-known methods known in the art. The esterification reaction may be carried out with or without catalysts. If catalyst is used, any acid, base or metal catalyst that will function as a catalyst for the esterification conditions may be used.

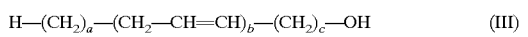

(III)

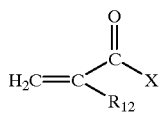

(IV)

The preferred acrylic derivatives IV that may be employed in the esterification reaction are those in which $R_{12}$ is either hydrogen or methyl and X is —Cl, —Br, —OH, or —OR, where R is an alkyl group having 1 to 4 carbon atoms such as methyl, ethyl, propyl, and butyl. Accordingly, the preferred acrylic derivatives IV that may be employed to form the acrylate or methacrylate esters of fatty alcohols are acryloyl chloride, acryloyl bromide, methacryloyl chloride, methacryloyl bromide, acrylic acid, methacrylic acid, methyl acrylate, and methyl methacrylate.

The temperature at which step (a) is conducted ranges from about –10° C. to about 150° C., preferably from about 10° C. to about 100° C. The pressure in this step (a) is not critical and can be subatmospheric, atmospheric, or super atmospheric.

The reaction times in step (a) will generally range from about 15 minutes to about 6 hours or longer and sometimes under an inert atmosphere such as nitrogen.

Using the procedure of step (a) outlined herein, the fatty alcohol III undergoes esterification reaction with carboxylic acid or its derivatives IV to form the corresponding acrylate or methacrylate ester of a fatty alcohol V.

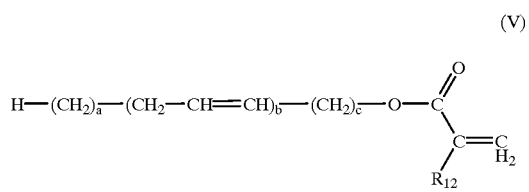

(V)

In step (b) the acrylate ester of the fatty alcohol V is subjected to emulsion polymerization conditions in the presence of one or more of polymerizable comonomers. This step (b) is same as the step (a) of the process of making a latex containing the substituted long-chain olefinic compound having an ethylenically unsaturated moiety (i.e., I or II) described hereinabove. The polymerizable comonomers are those which are described hereinabove.

The temperature at which step (b) is conducted ranges from about 20° C. to about 75° C. The pressure in this step (b) is not critical and can be subatmospheric, atmospheric, or super atmospheric.

The reaction times in step (b) will generally range from about 1 hour to about 6 hours or longer and sometimes under an inert atmosphere such as nitrogen.

Using the procedure of step (b) outlined herein, the acrylate ester of the fatty alcohol V undergoes polymerization reaction with copolymerizable monomers to form the copolymers dispersed in water.

The step (c) of this specific embodiment is same as the step (b) of the process of making a latex described hereinabove. In this step (c) of the process of this specific embodiment the copolymer so formed in step (b) still dispersed in water is further blended with at least one or more of a metal drier, surfactant, and desired combinations of the additives to form the waterborne formulations suitable for use in coatings, adhesives, or inks applications.

As mentioned hereinabove, the compositions of this invention have utility in a diverse variety of applications. For instance, the compositions of this invention can be converted to redispersible latex powder by physical drying of the latex composition. The compositions of this invention can also be used to form solvent-free coatings such as adhesives, including pressure sensitive and contact adhesives, which can be used either at ambient or elevated temperatures. The inks or coatings formulations formed from the compositions of this invention may be in the form of waterborne latex or may be in the form of 100% solids.

A significant advantage of these compositions is that the coatings, inks, and adhesives formed from these compositions are essentially solvent and VOCs free formulations, thus eliminating environmental pollution yet featuring enhanced properties.

This invention is further illustrated by the following examples which are provided for illustration purposes and in no way limit the scope of the present invention.

EXAMPLES

General

In the Examples that follow, the following abbreviations are used:

$T_g$—Glass transition temperature.
NMR—Nuclear magnetic resonance spectroscopy, usually of either proton, $^1H$; and/or carbon 13, $^{13}C$ nuclei.
IR—Infrared spectroscopy.
DSC—Differential Scanning Calorimetry.
MFT—Minimum film forming temperature.
PVC—Pigment volume concentration.
VOC—Volatile organic content General Analytical Techniques Used for the Characterization A variety of analytical techniques are used to characterize various starting materials and the compositions of this invention which included the following:

NMR: $^1H$ and $^{13}C$ NMR spectra are recorded on a Bruker AX-200 MHz spectrometer with 5 mm probes at 200 and 50 MHz, respectively.

DSC: A Mettler DSC-30 is used to determine the $T_g$ of the films (mid point value).

The heating rate is maintained at 10° C./minute, generally, over a temperature range of −50° C. to 100° C. The flow rate of nitrogen or air is maintained at 20 mL/min.

MFT: MFT of latexes are determined by a MFFT Bar 90 equipment from Byk-Gardner in accordance with ASTM procedure No. D-2354.

Particle Size Determination

Particle size is measured by a Coulter N4 MD sub-micron particle size analyzer.

Tensile Strength Measurements

The tensile strength and percent elongation of the films are determined with a 810 Material Test System according to ASTM D-2370. The specimen are cut to a width of 13 mm, a thickness of 0.06–0.12 mm, and a gauge length of 15 mm. In most cases, the data reported represents an average of 8 measurements.

Measurements of Adhesion and Hardness

The clear latex film adhesion on differing substrates is measured in accordance with ASTM procedure No. D-3359. The latex hardness development is monitored in accordance with ASTM procedure No. D-3363.

Gel Content and Swelling Index

The extent of film cure is determined following the method described in U.S. Pat. No. 4,906,684 with minor modifications. The films that are air-dried for two weeks, and removed from the substrate are tested as follows: (1) About 2 grams samples of films are weighed into glass bottles containing 75 mL of toluene, the bottles are capped and shaken constantly; (2) after 3 days, the bottle contents are decanted onto a weighed fluorocarbon mesh screen (70 micron meter mesh opening), and washed with toluene; (3) the mesh screen is weighed, then dried in a vacuum oven until constant weight is obtained; and (4) after determining the weight of wet gel and dry gel, the gel content and swelling index are determined according to the following equations:

% Gel Content=(weight of dry gel×100)/weight of film

Swelling Index=(weight of wet gel−weight of dry gel)/weight of dry gel

Dry time: The dry time measurements of the film samples of the coatings compositions are measured in accordance with ASTM procedure No. D-1640.

Conical mandrel (⅛") measurements on the film samples are made according to ASTM D-522.

Scrub test is performed in accordance with ASTM procedure No. D-2486.

Sheen and Gloss of the film samples are measured according to ASTM D-523.

Contrast ratio is measured according to D-3022.

Example 1

Oleyl alcohol (26.8 grams) is placed in a three-neck flask under a blanket of nitrogen. The entire reaction contents are cooled in an ice bath. Methacryloyl chloride (10.5 grams) dissolved in about 50 mL of methylene chloride is added slowly to the cooled oleyl alcohol with vigorous stirring in about 2 hours. Triethylamine (11.5 g) dissolved in 25 mL of methylene chloride is subsequently added in about an hour. After addition of triethylamine, the solution is allowed to warm to ambient temperature and is stirred for another 4 hours in order to complete the reaction. The precipitated triethylammonium chloride is removed by filtration, and the filtrate is washed with brine solution (saturated NaCl) followed by washings with dil. NaOH and dil. HCl. The organic layer is dried with anhydrous magnesium sulfate and the solvent is removed in vacuo to yield oleyl methacrylate in good yields. Oleyl methacrylate is stabilized from polymerization by addition of approximately 10 ppm hydroquinone. The structure of the product is verified by $^1H$ and $^{13}C$ NMR spectroscopy.

Example 2

Example 1 is substantially repeated in Example 2 with the exception that the reaction is carried out using acryloyl chloride and oleyl alcohol as follows. 26.8 grams of oleyl alcohol is reacted with 9.1 grams of acryloyl chloride in the presence of 11.5 grams of triethylamine. The product is characterized by $^1H$ and $^{13}C$ NMR spectroscopy.

Example 3

This Example 3 illustrates the preparation of a latex containing the internally plasticizing long-chain olefinic monomer of this invention. To a 1 L reactor kettle equipped with an impeller and charged with 110 grams of deionized (DI) water, which is deoxygenated (DO) for about half an hour by heating to 80° C. under a nitrogen atmosphere, is added polyvinyl alcohol (80 grams of 10% solution) followed by the addition of 12 grams of Igepal CA-897 (octylphenol ethoxylates with 40 moles of ethylene oxide units obtained from Rhone-Poulenc), 1.2 grams of Igepal CA-630 (octylphenol ethoxylates with 9 moles of ethylene oxide units obtained from Rhone-Poulenc), and 0.6 grams of sodium bicarbonate. The contents are maintained at 80° C. under a blanket of nitrogen, and the preseeding is affected by the addition of ammonium persulfate (0.6 grams) and vinyl acetate (40 grams), and increasing the impeller speed to 200 rpm.

After 15 minutes of preseeding, a monomer mixture or pre-emulsion (a stable pre-emulsion can be obtained by mixing all the desirable monomers, surfactants and water over a stir plate for few minutes) consisting of 30 grams of oleyl methacrylate (prepared in accordance with Example 1) and 130 grams of vinyl acetate are added over a period of 3.5 hours at 75° C. maintaining the impeller speed at 200 rpm. Additional amounts of ammonium persulfate (0.6 grams) dissolved in 30 grams of DI water are cofed into the reactor over a period of 3.75 hours. After the addition of all of the monomers and initiators, the contents of the reactor are stirred at 150 rpm for an additional period of 2 hours at 80° C. The cooled latex is filtered from a cheese cloth or a medium mesh filter and poured into a clean container for further evaluation.

Examples 4 and 5

Example 3 is substantially repeated in Examples 4 and 5 with the exception that the latex is prepared using the following amounts of materials in each of these examples:

|  | Example 4 | Example 5[c] |
|---|---|---|
| 10% Polyvinyl alcohol | 40 grams | 60 grams |
| Igepal CA-897 (Rhone Poulenc) | 12 grams | 12 grams |
| Igepal CA-630 (Rhone Poulenc) | 1.2 grams | 1.2 grams |
| NaHCO$_3$ | 0.8 grams | 0.8 grams |
| DI, DO water | 150 grams | 140 grams |
| Ammonium persulfate | 0.6 grams | 0.2 grams |
| Vinyl acetate - for seeding | 40 grams | — |
| Vinyl acetate - with monomer emulsion | 114 grams | 147 grams |
| Oleyl methacrylate[a] | — | 16 grams |
| Oleyl acrylate[b] | 16 grams | — |
| Butyl acrylate | 30 grams | 34 grams |
| Sipomer WAM II (Rhone Poulenc) | — | 3 grams |
| Ammonium persulfate - initiator feed | 0.6 grams | 0.8 grams |
| DI, DO water - for initiator feed | 30 grams | 30 grams |

[a]from Example 1;
[b]from Example 2.

In both examples, the seeding is done at 80° C. for about 10 minutes, and the polymerization itself is conducted at 72° C. The monomers are added during a period of about 3.5 hours at an impeller speed of 200 rpm, along with the initiator cofed for about 3.75 hours, and post polymerized for about 1.5 hours.

The films are formed in these examples with and without the addition of metal driers. The samples with metal driers contain 0.08 weight percent (based on solids) of cobalt hydro-cure II (obtained from OMG, Inc., Cleveland, Ohio) as a metal drier, 0.5 weight percent (based on solids) DRI-RX (obtained from OMG, Inc., Cleveland, Ohio) as a drier accelerator, and 1 weight percent methyl ethyl ketone peroxide as a free radical initiator.

Example 6

Example 6 illustrates the formation of the Mill Base formulations used for the preparation of coatings compositions. Specified amounts of the ingredients given below are added to a Lightnin mixer at a mixing speed of 800 rpm, and mixed further at 3500 rpm for 20 minutes.

| Ingredients | Example 6 |
|---|---|
| Tronox CR-800 (Kerr McGee) | 455 grams |
| Huber 70C (DuPont) | 292.5 grams |
| Beaverwhite 325 (ECC) | 260 grams |
| Duramite (ECC) | 325 grams |
| Natrosol Plus (Aqualon) | 12 grams |
| Kathon LX 1.5% (Rohm & Haas) | 5 grams |
| KTPP (Aldrich) | 6.5 grams |
| Byk 034 (Byk Chemie) | 12 grams |
| Tamol 731 25% (Rohm & Haas) | 39 grams |
| Surfynol 465 (Air Products) | — |
| DI water | 715 grams |

Examples 7 and 8

The Examples 7 and 8 illustrate the formation of coatings compositions using the polymeric latices of this invention. The latices formed in Examples 4 and 5 are used in these Examples to form the vinyl-acrylic latex coatings compositions. The coatings are pigmented at 55% pigment volume concentration (PVC) using the Mill Base formulation of Example 6. The ingredients and the respective amounts for forming the coatings compositions are given below. The following coatings compositions are prepared using a Lightnin mixer set at 200 rpm.

| Ingredients | Example 7 | Example 8 |
|---|---|---|
| Example 6 - Mill Base Formulation | 180 grams | 180 grams |
| DI water | 30 grams | 22 grams |
| Na$_2$CO$_3$ (20%) | 6 grams | 7 grams |
| Byk 035 (Byk Chemie) | 0.4 grams | 0.4 grams |
| Surfynol 465 (Air Products) | 1 gram | 1 gram |
| Latex | Example 4 | Example 5 |
| % solids | 45 | 43 |
| Amount | 87 grams | 92 grams |
| Rompaque OP - 62 LO (36.5%) (Rohm & Haas) | 20 grams | 20 grams |
| Polyphobe 107 (25%) (Union Carbide) | 0.8 grams | 1.2 grams |
| Polyphobe 102 (25%) (Union Carbide) | 5 grams | 6 grams |

Coating films are cast onto Leneta charts, aluminum and steel panels, and the film properties are evaluated.

Example 8

This Example 9 illustrates the use of the internally plasticizing monomer of this invention directly in an UV curable formulation. An ink formulation is made using oleyl acrylate formed in accordance with Example 2 as follows. Specified amounts of the ingredients as given below are blended in a Lightnin mixer at 150 rpm for one hour and then to insure thorough mixing the ingredients are transferred to a ball mill and ground to a Hegman #7.

| Ingredients | Parts by weight |
|---|---|
| Oleyl acrylate, from Example 2 | 21.4 |
| Fluorescent rocket red AX-135 (Day Glo Color) | 1.0 |
| Photomer 3016 (Henkel) | 17.0 |
| Photomer 4061 (Henkel) | 19.0 |
| Photomer 4094 (Henkel) | 15.6 |
| Photomer 4149 (Henkel) | 4.4 |
| Photomer 4770 (Henkel) | 5.5 |
| Photomer 6008 (Henkel) | 11.2 |
| Byk 065 (Byk Chemie) | 0.4 |
| Byk 358 (Byk Chemie) | 0.3 |

-continued

| Ingredients | Parts by weight |
| --- | --- |
| Byk 325 (Byk Chemie) | 0.3 |
| Irgacure 651 (Ciba) | 2.7 |
| Benzophenone | 1.3 |

A 2 mil thick film is applied onto wood, aluminum, paper and steel panels with a draw bar, and irradiated under a 600 W medium pressure mercury UV lamp for 4 seconds at a distance of approximately 7" with a Fusion UV curing source to a hard, smooth film. Similar formulations and applications can be developed using other specialty monomers described herein.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A composition suitable for forming coating, adhesive, and ink formulations comprising an aqueous dispersion comprising of a blended mixture of:
   (a) a polymer obtained by the polymerization of:
      (i) an internally plasticizing and crosslinkable monomer derived from a fatty acid compound having at least one double bond; and
      (ii) one or more ethylenically unsaturated monomers copolymerizable therewith;
   (b) a drier selected from the group consisting of aliphatic carboxylic acid salts of cobalt, manganese, lead, zirconium, calcium, and mixtures thereof; and
   (c) a surface-active agent;
   wherein the total weight percent of said polymer in said aqueous dispersion is at least from about 5 and not more than about 80 weight percent, wherein said monomers (i) and (ii) are present in the weight ratio ranging from about 1:2 to about 1:99.

2. The composition as set forth in claim 1 wherein said monomer (i) is an ethylenically unsaturated compound of the formula:

$$R_1-(C)_a^{R_2}_{R_3}-(C)^{R_4}_{R_5}-C=C)_b^{R_6}_{}^{R_7}-(C)_c^{R_8}_{R_9}-Z-C=C{}^{R_{10}}_{R_{11}}{}_{R_{12}}$$

wherein
   (a) $R_1$, $R_2$, $R_3$, $R_4$, $R_5$, $R_6$, $R_7$, $R_8$, and $R_9$, are the same or different and are each independently selected from the group consisting of:
      hydrogen;
      an alkoxy group having 1 to 10 carbon atoms;
      an alkoxyalkyl group having 1 to 10 carbon atoms; and
      linear or branched alkyl and fluoroalkyl groups having the formula $C_nH_xF_y$, where n is an integer from 1 to 10, x and y are integers from 0 to 2n+1, and the sum of x and y is 2n+1;
   (b) Z is selected from the group consisting of:
      —(CO)—O—O—;
      —(CO)—O—R—O—(CO)—;
      —(CO)—O—R—(CO)—O—;
      —(CO)—O—R—O—;
      —CH$_2$O—;
      —CH$_2$O—(CO)—;
      —CH$_2$O—R—O—;
      —CH$_2$O—R—O—(CO)—;
      —CH$_2$O—R—(CO)—O—;
      —(CO)—NR'—R—O—(CO)—;
      —(CO)—NR'—R—(CO)—O—;
      —(CO)—NR'—R—O—;
      —CH$_2$NR'—R—O—(CO)—;
      —CH$_2$NR'—R—(CO)—O—;
      —CH$_2$NR'—R—O—; and
      —CH$_2$NR'—(CO)—;
      where (i) R is a divalent organic moiety selected from the group consisting of:
         arylene and substituted arylene groups having 6 to 10 carbon atoms; and
         linear or branched alkylene and fluoroalkylene groups having the formula $C_nH_xF_y$, where n is an integer from 1 to 10, x and y are integers from 0 to 2n, and the sum of x and y is 2n; and
      (ii) R' is selected from the group consisting of:
         hydrogen, phenyl, substituted phenyl, tolyl, substituted tolyl, benzyl, substituted benzyl;
         an alkoxyalkyl group having 1 to 10 carbon atoms;
         a hydroxyalkyl group having 1 to 10 carbon atoms;
         an acyloxyalkyl group having 1 to 10 carbon atoms;
         a linear or branched alkenyl group having 2 to 10 carbon atoms; and
         linear or branched alkyl and fluoroalkyl groups having the formula $C_nH_xF_y$, where n is an integer from 1 to 10, x and y are integers from 0 to 2n+1, and the sum of x and y is 2n+1; and
   (c) $R_{10}$, $R_{11}$, and $R_{12}$ are the same or different and are independently selected from the group consisting of:
      hydrogen;
      a carboxylate of the formula —COOR, where R is alkyl group having 1 to 10 carbon atoms, phenyl or substituted phenyl;
      phenyl and substituted phenyl;
      tolyl and substituted tolyl;
      benzyl and substituted benzyl;
      a linear or branched alkenyl group having 2 to 10 carbon atoms; and
      linear or branched alkyl and fluoroalkyl groups having the formula $C_nH_xF_y$, where n is an integer from 1 to 10, x and y are integers from 0 to 2n+1, and the sum of x and y is 2n+1; and
   (d) a, b, and c, are integers, where a and c have a value of from 0 to 20, and the sum of a and c is at least 10, and b has a value of 1 or 2.

3. The composition as set forth in claim 2 wherein said ethylenically unsaturated compound is derived from a fatty compound having an iodine value less than 150.

4. The composition as set forth in claim 3 wherein said ethylenically unsaturated compound is derived from a fatty acid selected from the group consisting of oleic acid, elaidic acid, linoleic acid, erucic acid, brassidic acid, nervonic acid, and vernolic acid.

5. The composition as set forth in claim 2 wherein $R_{10}$ and $R_{11}$ are hydrogen, and $R_{12}$ is either methyl or hydrogen.

6. The composition as set forth in claim 1 wherein said copolymerizable monomer is selected from the group consisting of vinyl acetate, alkyl acrylate and alkyl methacrylate where alkyl contains 1 to 20 carbon atoms, styrene, para-acetoxystyrene, acrylic acid, methacrylic acid, butyl fumarate, octyl fumarate, propylene glycol monoester of methacrylic acid, propylene glycol monoester of acrylic acid, ethylene glycol monoester of methacrylic acid, ethylene glycol monoester of acrylic acid, glycidyl methacrylate, glycidyl acrylate, hydroxyethyl methacrylate, hydroxyethyl acrylate, vinylidene chloride, ethylene, butadiene, acrylamide, N-methylol acrylamide, vinyl chloride, butyl maleate, octyl maleate, vinyl pyridine, dimethylaminoethyl methacrylate, methacrylamidoethylethyleneurea, acrylamidoethylethyleneurea, 3-isopropenyl-α,α-dimethylbenzyl isocyanate, vinyl silanes, vinyl esters of neo acids, vinyl sulfonate, and styrene sulfonate.

7. The composition as set forth in claim 1 which further comprises at least one additive selected from the group consisting of protective colloids, fillers, coloring agents, antiseptics, biocides, dispersing agents, thickening agents, thixotropic agents, antifreezing agents, and pH adjusting agents.

8. The composition as set forth in claim 7 wherein said colloid is selected from the group consisting of partially and fully hydrolyzed polyvinyl alcohol, hydroxyethyl cellulose, hydroxymethyl cellulose, ethylhydroxyethyl cellulose, carboxymethyl cellulose, ethoxylated starch derivatives, polyacrylic acid, alkali metal polyacrylates, polyacrylamide, poly(methyl vinyl ether/maleic anhydride), polyvinylpyrrolidone, water soluble starch, glue, gelatin, water soluble alginates, guar, gum arabic and gum tragacanth.

9. The composition as set forth in claim 8 wherein said colloid is present in an amount ranging from about 0.1 weight percent to about 2 weight percent based on the total weight of the composition.

10. The composition as set forth in claim 1 wherein said surface-active agent is either an anionic, cationic, amphoteric, or nonionic surfactant.

11. The composition as set forth in claim 1 wherein the total solids content including said polymer is from about 30 to about 70 percent by weight based on the total weight of said aqueous dispersion.

12. A process for the formation of a waterborne formulation for coatings, inks or adhesives containing an ethylenically unsaturated compound derived from a semi- or non-drying oil comprising the steps of:

(a) subjecting said derivative of an ethylenically unsaturated compound to polymerization conditions in the presence of at least one other ethylenically unsaturated copolymerizable monomer for a period of time and under conditions of temperature and pressure so as to form a dispersion of said polymer in an aqueous phase; and (b) blending said dispersion of said polymer with at least one drier selected from the group consisting of aliphatic carboxylic acid salts of cobalt, manganese, lead, zirconium, calcium, and mixtures thereof, and in the presence of at least one ionic or non-ionic surface-active agent to form the formulation.

13. The process as set forth in claim 12 wherein said ethylenically unsaturated compound has the formula:

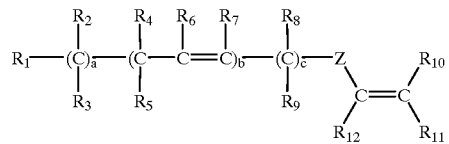

wherein (a) $R_1$, $R_2$, $R_3$, $R_4$, $R_5$, $R_6$, $R_7$, $R_8$, and $R_9$, are the same or different and are each independently selected from the group consisting of:
hydrogen;
an alkoxy group having 1 to 10 carbon atoms;
an alkoxyalkyl group having 1 to 10 carbon atoms; and
linear or branched alkyl and fluoroalkyl groups having the formula $C_nH_xF_y$, where n is an integer from 1 to 10, x and y are integers from 0 to 2n+1, and the sum of x and y is 2n+1;

(b) Z is selected from the group consisting of:
—(CO)—O—;
—(CO)—O—R—O—(CO)—;
—(CO)—O—R—(CO)—O—;
—(CO)—O—R—O—;
—CH$_2$O—;
—CH$_2$O—(CO)—;
—CH$_2$O—R—O—;
—CH$_2$O—R—O—(CO)—;
—CH$_2$O—R—(CO)—O—;
—(CO)—NR'—R—O—(CO)—;
—(CO)—NR'—R—(CO)—O—;
—(CO)—NR'—R—O—;
—CH$_2$NR'—R—O—(CO)—;
—CH$_2$NR'—R—(CO)—O—;
—CH$_2$NR'—R—O—; and
—CH$_2$NR'—(CO)—;

where (i) R is a divalent organic moiety selected from the group consisting of:
arylene and substituted arylene groups having 6 to 10 carbon atoms; and
linear or branched alkylene and fluoroalkylene groups having the formula $C_nH_xF_y$, where n is an integer from 1 to 10, x and y are integers from 0 to 2n, and the sum of x and y is 2n; and (ii) R' is selected from the group consisting of:
hydrogen;
phenyl, substituted phenyl, tolyl, substituted tolyl, benzyl, substituted benzyl;
an alkoxyalkyl group having 1 to 10 carbon atoms;
a hydroxyalkyl group having 1 to 10 carbon atoms;
an acyloxyalkyl group having 1 to 10 carbon atoms;
a linear or branched alkenyl group having 2 to 10 carbon atoms; and
linear or branched alkyl and fluoroalkyl groups having the formula $C_nH_xF_y$, where n is an integer from 1 to 10, x and y are integers from 0 to 2n+1, and the sum of x and y is 2n+1; and (c) $R_{10}$, $R_{11}$, and $R_{12}$ are the same or different and are independently selected from the group consisting of:
hydrogen;
a carboxylate of the formula —COOR, where R is alkyl group having 1 to 10 carbon atoms, phenyl or substituted phenyl;
phenyl and substituted phenyl;
tolyl and substituted tolyl;
benzyl and substituted benzyl;

a linear or branched alkenyl group having 2 to 10 carbon atoms; and linear or branched alkyl and fluoroalkyl groups having the formula $C_nH_xF_y$, where n is an integer from 1 to 10, x and y are integers from 0 to 2n+1, and the sum of x and y is 2n+1; and (d) a, b, and c, are integers, where a and c have a value of from 0 to 20, and the sum of a and c is at least 10, and b has a value of 1 or 2.

14. The process as set forth in claim 13 wherein said ethylenically unsaturated compound is derived from a fatty compound selected from the group consisting of oleic acid, elaidic acid, linoleic acid, erucic acid, brassidic acid, nervonic acid and vernolic acid.

15. The process as set forth in claim 13 wherein said fatty compound is obtained from either a semi- or non-drying oil having an iodine value less than 150.

16. The process as set forth in claim 12 wherein in step (a) the temperature is from about 10° C. to about 90° C. and the pressure is atmospheric; and wherein step (b) is performed under conditions in which the temperature is from about 10° C. to about 40° C. and the pressure is atmospheric.

17. The process as set forth in claim 12 wherein in step (a) the polymerization conditions include an initiator.

18. The process as set forth in claim 12 wherein in step (a) said initiator is a free radical initiator which is activated either by a thermal, or redox source.

19. A product produced in accordance with the process of claim 13.

20. A process for preparing a latex coating composition comprising a polymer formed from an acrylate or methacrylate ester of a fatty compound which comprises the steps of:

(a) subjecting a fatty alcohol of the formula:

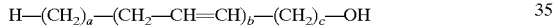

to esterification conditions in the presence of an acrylic or methacrylic acid of the formula:

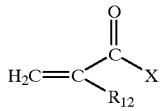

at a temperature of about 10° C. to about 100° C. for a period of about 15 minutes to about 6 hours to form the acrylate or methacrylate ester of the fatty alcohol of the formula:

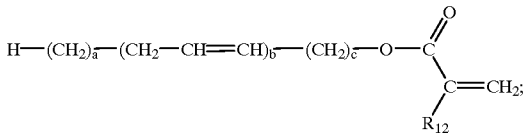

(b) subjecting said acrylate or methacrylate ester of the fatty alcohol to emulsion polymerization conditions in an aqueous phase in the presence of one or more of polymerizable comonomers selected from the group consisting of vinyl acetate, vinyl chloride, vinyl ester of versatic acid, acrylic acid, acrylonitrile, acrylamide, butyl acrylate, butyl methacrylate, methyl acrylate, methyl methacrylate, 2-ethylhexyl acrylate, 2-ethylhexyl methacrylate, 2-hydroxyethyl acrylate, 2-hydroxyethyl methacrylate, glycidyl acrylate, glycidyl methacrylate, and styrene; and a free radical initiator at a temperature of about 20° C. to about 75° C. for a period of about 1 hour to 6 hours to form a polymer of said acrylate or methacrylate ester of hydroxy fatty ester with said comonomers; and (c) blending said polymer with at least one metal drier selected from the group consisting of aliphatic carboxylic acid salts of cobalt, manganese, lead, zirconium, calcium, and mixtures thereof, and in the presence of at least one ionic or non-ionic surface-active agent to form the latex;

wherein (i) $R_{12}$ is either hydrogen or methyl;

(ii) X is selected from the group consisting of:
Br;
Cl;
hydroxy;
an alkoxy group having 1 to 4 carbon atoms; and
an acyloxy group having 2 to 4 carbon atoms; and (iii) a, b, and c, are integers, where a and c have a value of from 5 to 12, and b has a value of 1 or 2.

21. A product produced in accordance with the process of claim 20.

* * * * *